United States Patent [19]

Scott et al.

[11] 4,280,155
[45] Jul. 21, 1981

[54] METHOD OF IMPROVING AIR FLOW IN COMPACT DISC DRIVE

[75] Inventors: John C. Scott, Saratoga; Robert I. McClure, Santa Clara, both of Calif.

[73] Assignee: Memorex Mini Disc Drive Corp., Santa Clara, Calif.

[21] Appl. No.: 45,363

[22] Filed: Jun. 4, 1979

[51] Int. Cl.³ .................. G11B 23/02; G11B 25/04; G11B 5/82

[52] U.S. Cl. .................................. 360/98; 360/133

[58] Field of Search ............... 360/98, 97, 99, 133, 360/86, 135; 206/444, 309

[56] References Cited

U.S. PATENT DOCUMENTS

| | | | |
|---|---|---|---|
| 3,548,394 | 12/1970 | Felts | 360/98 |
| 3,825,951 | 7/1974 | Katsumori et al. | 360/98 |
| 3,846,835 | 11/1974 | Horovitz et al. | 360/98 |
| 3,882,473 | 5/1975 | Hoehmann | 360/98 |
| 4,106,066 | 8/1978 | Kudo | 360/133 |
| 4,130,845 | 12/1978 | Kulma | 360/133 |
| 4,194,225 | 3/1980 | Hasler | 360/98 |

*Primary Examiner*—Alfred H. Eddleman
*Attorney, Agent, or Firm*—David W. Heid

[57] ABSTRACT

A method is described for improving the air flow over the surfaces of magnetic recording discs in a disc drive having a plurality of rotatingly driven such discs each having a diameter of less than nine inches and being coaxial and spaced from one another, and such disc drive having a plurality of selectively positionable magnetic transducer heads overlying portions of the discs, the method including spacing adjacent such discs a predetermined minimum distance from one another.

3 Claims, 5 Drawing Figures

METHOD OF IMPROVING AIR FLOW IN COMPACT DISC DRIVE

BACKGROUND OF THE INVENTION

This invention relates generally to the field of magnetic disc recording units. More particularly it relates to such units utilizing rigid recording discs of smaller than standard diameter to achieve a compact unit while still taking advantage of the advanced technology associated with such units of substantially larger size.

In the prior art it has been known to provide disc recording units utilizing a plurality of coaxial, rigid magnetic recording discs. Such discs conventionally were of about 14 inch diameter and were fabricated of aluminum coated with a suitable magnetizable coating. In the more advanced units utilizing the known technology the magnetic transducer heads which are used for reading and writing data on the discs are supported a fixed and relatively critical distance above the surface of the disc by the aerodynamic lift caused by the interaction of the moving air film carried by the flat surface of the rotating disc and a carefully designed transducer head configuration. Through the use of this advanced technology and the precision available through the use of fixed, instead of removable, disc recording media, it has been possible to achieve very high densities of data recorded on such discs. However, such conventional disc drives have generally been large console units, suitable only for relatively large installations because of both size and costs.

It has been conventional for applications requiring smaller size and/or lower costs in disc storage units to utilize disc drives incorporating a single flexible recording disc. Such a disc conventionally was of about eight inch diameter and was formed of a thin sheet of plastic material such as Mylar coated with a suitable magnetizable material. These disc drives conventionally could utilize only a single such disc, which is insertable and removable by the operator into and out of the disc drive. The inaccuracies associated with both the insertion and clamping of such a disc and the inaccuracies inherent in such a flexible and deformable medium have conventionally required that data tracks thereupon be spaced substantially apart, thus resulting in substantially lower recording density. Thus, the combination of mounting only a single disc at a time and the low data densities available have severely limited the usefulness of such small recording units.

Recently much effort has been made to combine the best features of both the large, sophisticated units and the small, inexpensive flexible disc drives. In such hybrid units discs generally similar to those used on large, sophisticated units, such as the Memorex Model 3650, but having a diameter of less than nine inches, and suitably about eight inches, have been provided, with a plurality of such discs on a single spindle. Also, advanced technology transducer heads have been utilized to achieve the high recording density required. In other respects, these small units were designed along conventional lines as well. For example, the conventional spacing between adjacent coaxial discs has been on the order of 0.3 inch, a spacing which has been found to yield highly satisfactory results in the larger units. However, in the development of these smaller, rigid disc drive units, a number of unexpected problems relating to the conventional technology were discovered. Apparently as a result of the substantially reduced volume of air contained within the disc drive enclosure, defined by the base plate and the housing cover, previously satisfactory air flow patterns were found to be severely disrupted. Specifically, it was found that using conventional technology resulted in highly undesirable turbulence of the air flow over certain portions of the disc surfaces, thus causing erratic spacing of the "flying" transducer heads above the disc surface and severely disrupting the desired recording and reading operations. Additionally, in view of the heat generated by the various motors for rotating the discs and for advancing and retracting the transducer heads, it became apparent that the reduced volume of air would cause undesired thermalgradients within the recording unit, particularly where external cooling fans had been eliminated to reduce the costs, size and complexity of the system. In an effort to overcome these problems one manufacturer of such disc drives has placed a specially designed shroud between adjacent discs in an effort to improve air flow. However, problems have still remained, and such shroud again adds to the complexity and cost of such a recording unit, both being undesirable characteristics.

SUMMARY OF THE INVENTION

In view of the problems and disadvantages of the prior art, it is an object of the present invention to provide a method for improving the air flow over the disc surfaces in a compact, small diameter rigid magnetic disc recording unit. It is a further object to provide such a method for improving air flow which is simple, effective and economical. To achieve these and other objects of the invention which will become apparent the method of improving the air flow over the discs is provided in a compact magnetic recording disc drive having a plurality of rotatingly driven rigid magnetic recording discs, each of which disc has a diameter of less than nine inches and is coaxial with and spaced from one another, the disc drive also having a plurality of selectively positionable magnetic transducer heads overlying portions of the discs and being supported a predetermined distance from the rotating disc by aerodynamic lift caused by the interaction of the moving air films carried by the flat surfaces of the rotating discs and the transducer heads. The method of improving the air flow over the disc surfaces to stabilize the support of the transducer heads or reducing thermalgradients include spacing the adjacent such recording discs from one another a distance of at least 0.9 inch. In a particularly preferred embodiment it is further desirable to space the recording disc adjacent the base plate a distance of at least 0.9 inch from the base plate and to space the recording discs whose broad surfaces adjacent the cover a distance of at least 0.9 inch from the cover.

BRIEF DESCRIPTION OF THE DRAWINGS

The method of this invention is illustrated in conjunction with apparatus described in detail below in which.

DESCRIPTION OF A PREFERRED EMBODIMENT

The method of this invention can best be illustrated in conjunction with a suitable compact magnetic disc recording unit which employs the teaching of the method. Such a unit is illustrated in FIGS. 1 through 5 and includes, generally, a base plate 2, suitably of aluminum plate or similar material, a housing cover 4, suitably of a transparent or semi-transparent synthetic resin, a plurality of rotatably driven magnetic recording discs 6 and 8, and a magnetic transducer head carriage and positioning assembly 10.

Figure 1:
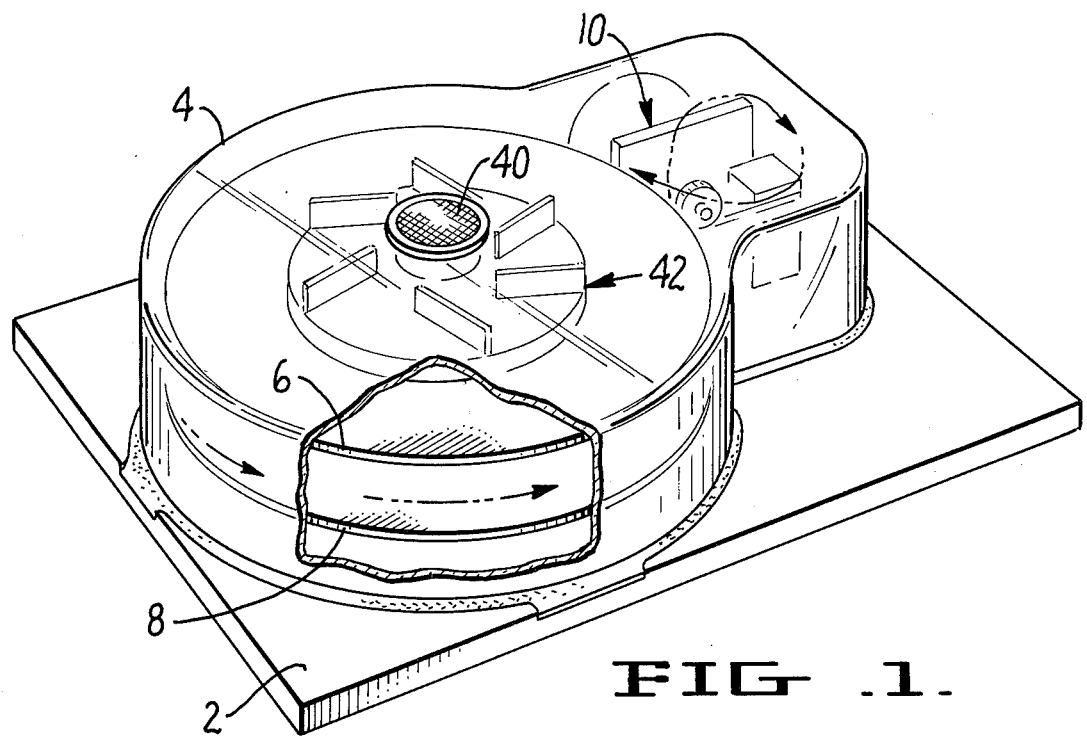
FIG. 1 is a perspective view, partially in section, of apparatus employing the teachings of the present invention.
Figure 2:
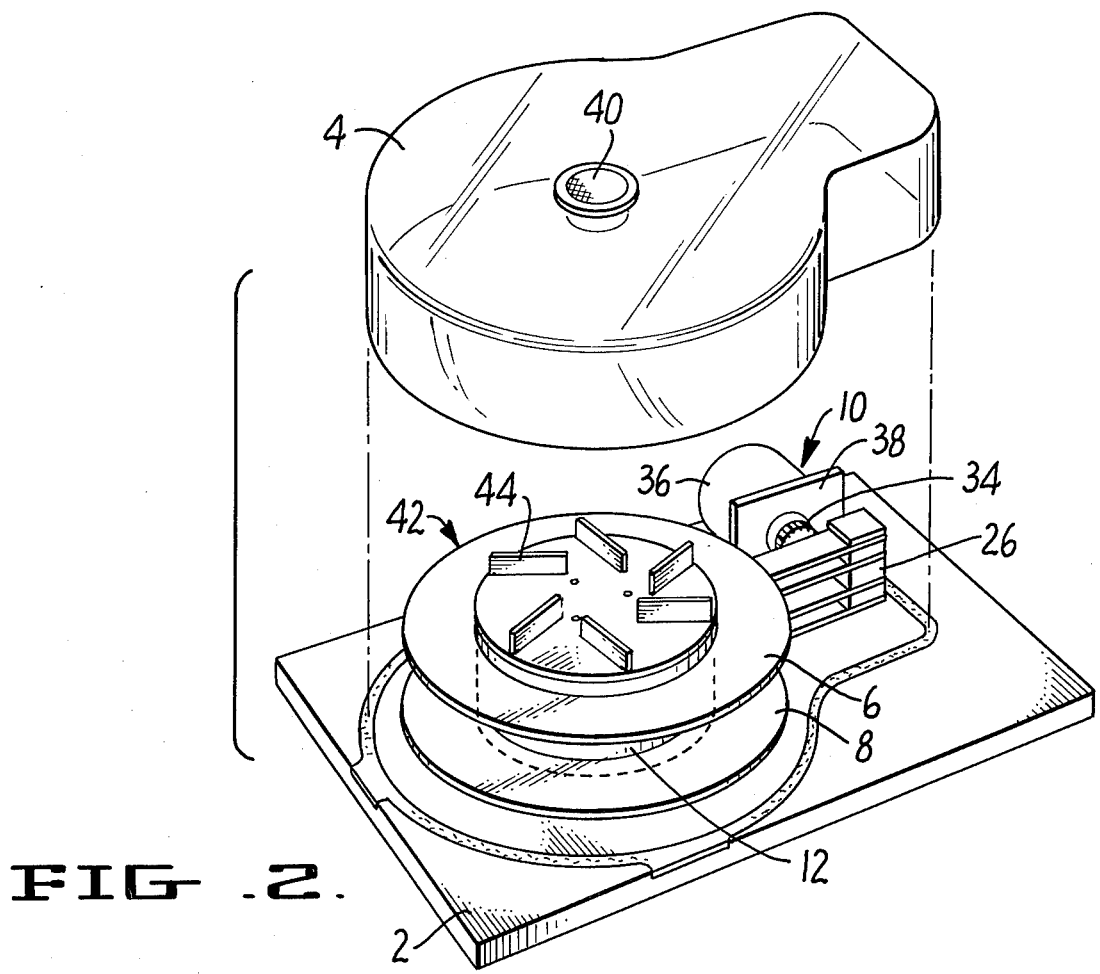
FIG. 2 is a perspective view of the apparatus of FIG. 1 with the housing cover displaced.
Figure 3:
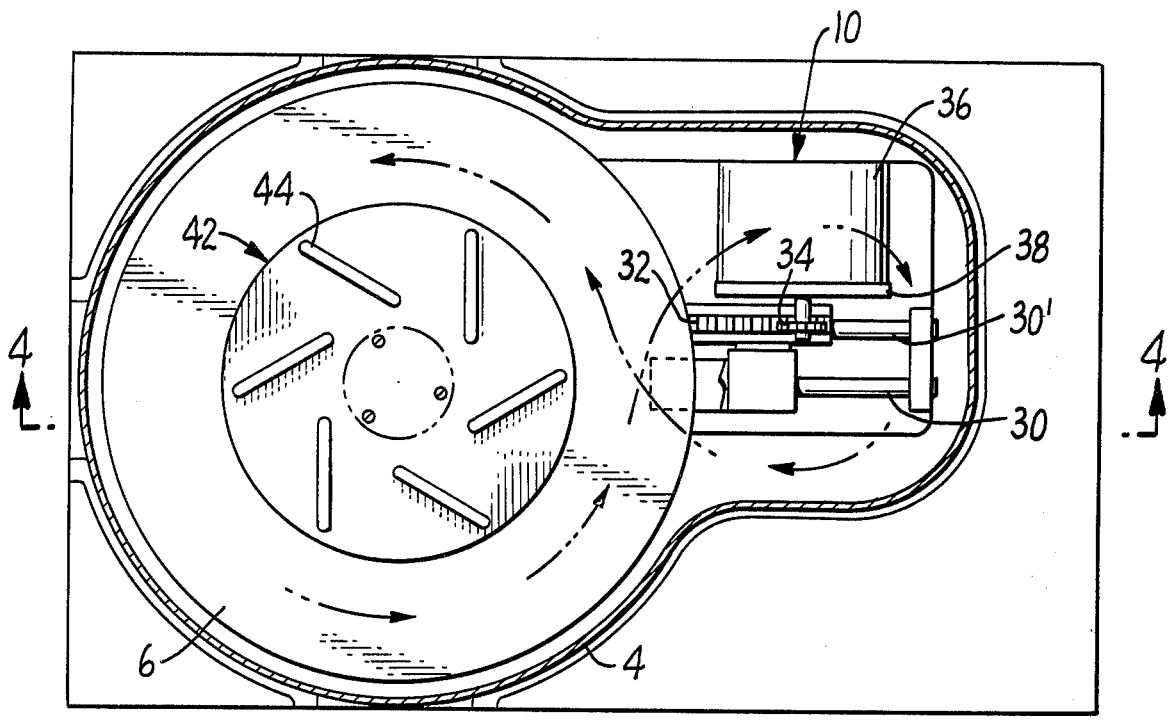
FIG. 3 is a plan view of the apparatus of FIG. 1 illustrating the general path of air flow.
Figure 4:
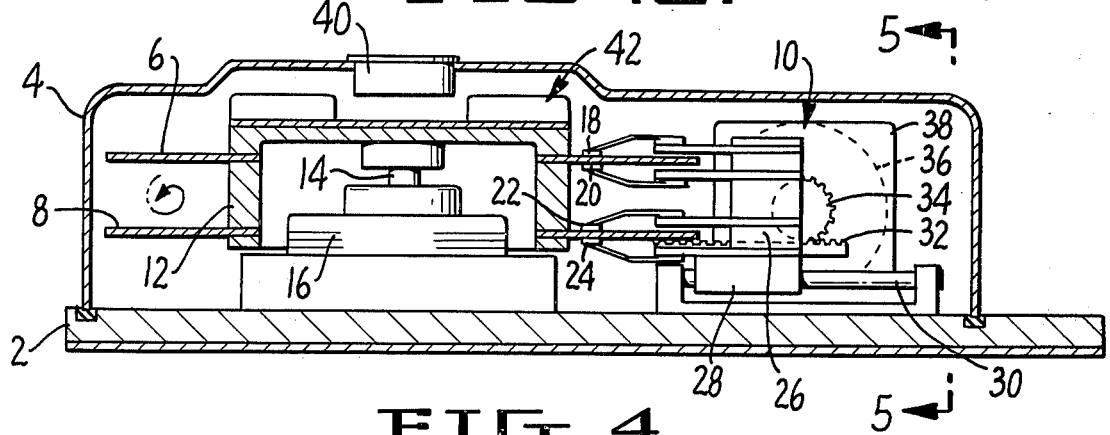
FIG. 4 is a side sectional view of the apparatus of FIG. 3, taken along line 4—4.
Figure 5:
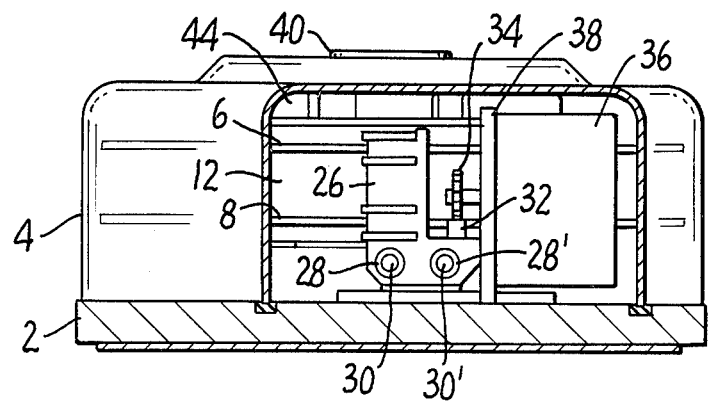
FIG. 5 is an end sectional view of the apparatus of FIG. 4 taken along line 5—5.

The two recording discs 6 and 8 are part of a recording disc assembly illustrated best in the sectional view of FIG. 4. The discs 6 and 8 are generally similar in nature to those used on larger and more sophisticated disc drives, such as the Memorex Type 3650, but, to reduce the size, are of a diameter of less than nine inches, suitably about eight inches. These discs 6 and 8 are coaxially mounted, in axially spaced relation, to a hub 12, which in turn is mounted to the shaft 14 of a suitable drive means. Such drive means could desirably be either a motor 16 mounted to the base plate 2 within the hub 12, or a suitable shaft and bearing arrangement providing for belt drive from a motor situated elsewhere.

For each of the discs of this unit at least two magnetic transducer heads are provided, one positioned adjacent each of the opposed flat surfaces of the disc. As shown in FIG. 4 these include heads 18 and 20 for the upper disc 6 and heads 22 and 24 for the lower disc 8. These heads suitably may be substantially similar to those utilized in larger disc recording units, such as the Memorex 3650. These heads 18, 20, 22 and 24 are mounted to a carriage 26 which suitably may be supported on a pair of ball bushings 28 and 28' which are carried on shafts 30 and 30' mounted to the base plate 2 parallel to the surfaces of the discs 6 and 8. Also mounted to head carriage 26 are suitable means, such as rack 32 which is engaged by actuating means such as pinion 34 rotatably driven by stepper motor 36. This stepper motor driving the rack 32 through pinion 34 provides for movement of the transducer head generally toward and away from the axis of the discs. The stepper motor° is mounted to suitable means such as mounting plate 38 affixed to base plate 2.

The power and control means for driving the disc rotating motor 16 and for driving and controlling the head assembly stepper motor 36 are conventional and well known to those skilled in the art. Similarly, the preferred "Winchester" technology transducer heads 18, 20, 22 and 24 and the associated magnetic disc coatings are also well known to those skilled in the art.

For the sake of simplicity and compactness, the base plate 12 may suitably be a solid unit and, in conjunction with the housing cover 4, may form a substantially closed system. This arrangement is provided instead of the more elaborate flow-through air systems utilized with larger apparatus for the sake of simplicity and economy. When the housing cover 4 is in place the only opening is through the filter 40 which is positioned in the cover and generally aligned with the axis of the recording discs. This filter permits some amount of interchange between the air inside the drive unit and the ambient and is necessary to accommodate pressure gradients occurring during operation of the apparatus.

Directly below the filter 40 and atop the disc hub 12 is mounted a vane assembly 42, which suitably may be in the form of a flat disc having a plurality of axially projecting vanes 44, the entire unit suitably being formed of a molded synthetic resin.

When apparatus generally similar to that described immediately above was initially fabricated, the spacing between the discs 6 and 8 was generally the same as that conventionally used on larger disc drive units, such as the Memorex 3650. This spacing was on the order of 0.3 inch. However, it was found during testing that such arrangement provided several disadvantages. Specifically, the air flow between the two discs experienced substantial turbulence such that the aerodynamic spacing of the heads 20 and 22 from their respective disc surfaces varied erratically and unacceptably. Additionally, it was found that such close spacing provided for insufficient interchange of the air in the various portions of the disc drive, thus resulting in undesirable thermal gradients from the heat generated by the motors. While such could have been solved by the inclusion of a flow through air system, such a flow through air system would have added significantly to the complexity, cost and size of the apparatus, all being undesirable characteristics for a unit of this type. In the course of the development it was unexpectedly discovered that, by spacing the discs 6 and 8 not less than 0.9 inch apart the air flow was substantially improved, eliminating the transducer head-disturbing turbulence and nearly eliminating the undesired thermal gradients previously experienced. Further, it was found that by the provision of a cover such as illustrated, which is spaced only a small distance (on the order of 0.25 inch) from the periphery of the rotating discs around a substantial portion (about 270°) of the discs and then having a bay off to the side adjacent the remainder of the periphery of the discs, an air flow generally as indicated by the arrows in FIG. 3, having an appropriate figure-8 pattern, was obtained. This air flow effects interchange of the air and circulates cooling air both around the disc hub 12 and over the head positioning stepper motor 36. It is further been found to promote the desirable air flow to space the recording disc 8 adjacent the base plate 2 a distance of at least 0.9 inch from that base plate and to space the upper recording disc 6, whose broad surface is adjacent the housing cover 4, a distance of at least 0.9 inch from that cover. Through the use of these techniques the problems of undesirably turbulent, head-disturbing air flow and undesirable thermal gradients have been eliminated, without the necessity of additional shrouds or other complexity-adding structures as used in the prior art. By way of example, in the apparatus described above, with the disc drive motor rotating at 2964 revolutions per minute the increase in temperature within the enclosed recording unit was found to be about 3° C. This contrasts markedly with the temperature increase in a conventional disc drive, which is on the order of 40° C. Thus, the combination of these particularly desirable spacings, along with the provision of the vaned assembly 42 atop the disc hub with the adjacent filter 40 opening to the ambient atmosphere have been found to provide highly satisfactory air flow and performance.

While the foregoing illustrates and describes in detail a particularly preferred embodiment with which the method of this apparatus is used, it is to be recognized that such is illustrative only of the principles of this invention and is not to be considered limitative thereof. Accordingly, since numerous variations and modifications, all within the scope of the invention, will readily occur to those skilled in the art, the scope of this invention is to be limited solely by the claims appended hereto.

We claim:

1. In a compact magnetic recording disc drive having a plurality of rotatingly driven rigid magnetic recording discs each having a diameter of less than nine inches and being coaxial with and space from one another and a plurality of selectively positionable magnetic transducer heads overlying portions of said discs and being suported a predetermined distance from the rotating discs by aerodynamic lift caused by the interaction of the moving air films carried by the flat surface of the rotating discs and the transducer heads said disc drive being supported by a base plate and enclosed by a cover, said cover having a length and a width, one of the dimensions being less than nine inches, the method of improving the air flow over the disc surfaces to stabilize the support of the transducer heads while reducing thermal gradients, comprising spacing adjacent said recording discs from one another a distance of at least 0.9 inch.

2. The method of improving air flow according to claim 1 further comprising spacing the recording disc adjacent said base plate a distance of at least 0.9 inch from said base plate.

3. The method of improving air flow according to claim 1 further comprising spacing the recording disc whose broad surface is adjacent said cover a distance of at least 0.9 inch from said cover.

* * * * *